May 26, 1936.  F. A. MANSKE  2,041,773
RESILIENT BUILDING WALL CLIP CONSTRUCTION
Filed Dec. 19, 1932  2 Sheets-Sheet 2
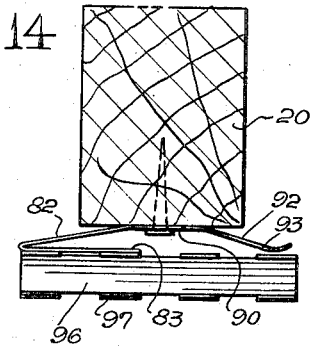
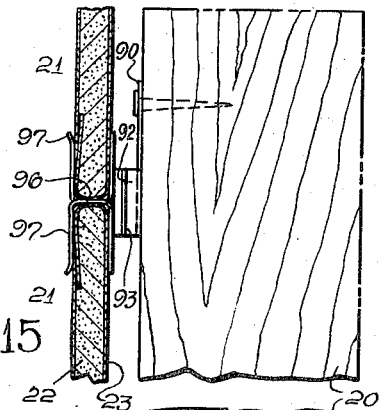
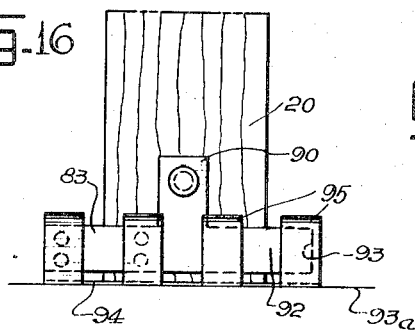
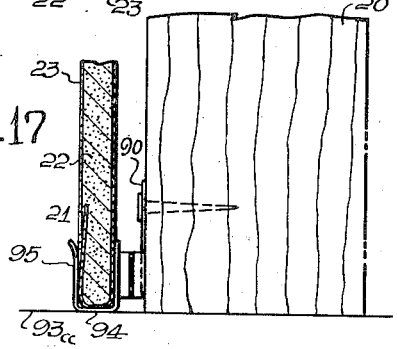
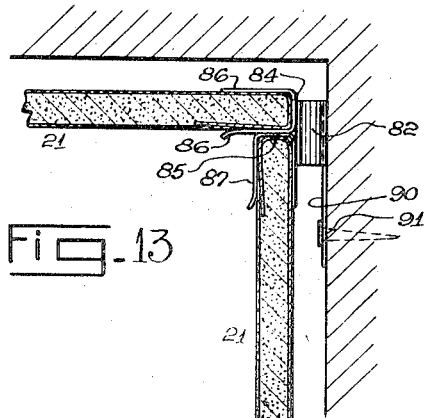
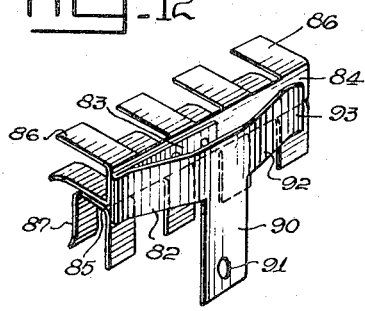
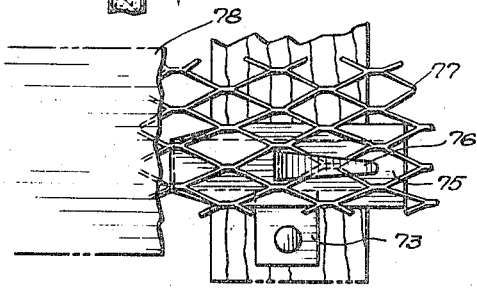
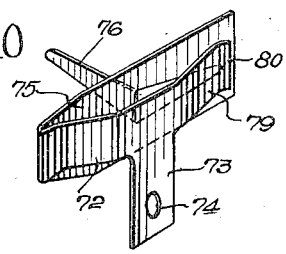
INVENTOR
FRED A. MANSKE.
BY
ATTORNEY Patented May 26, 1936

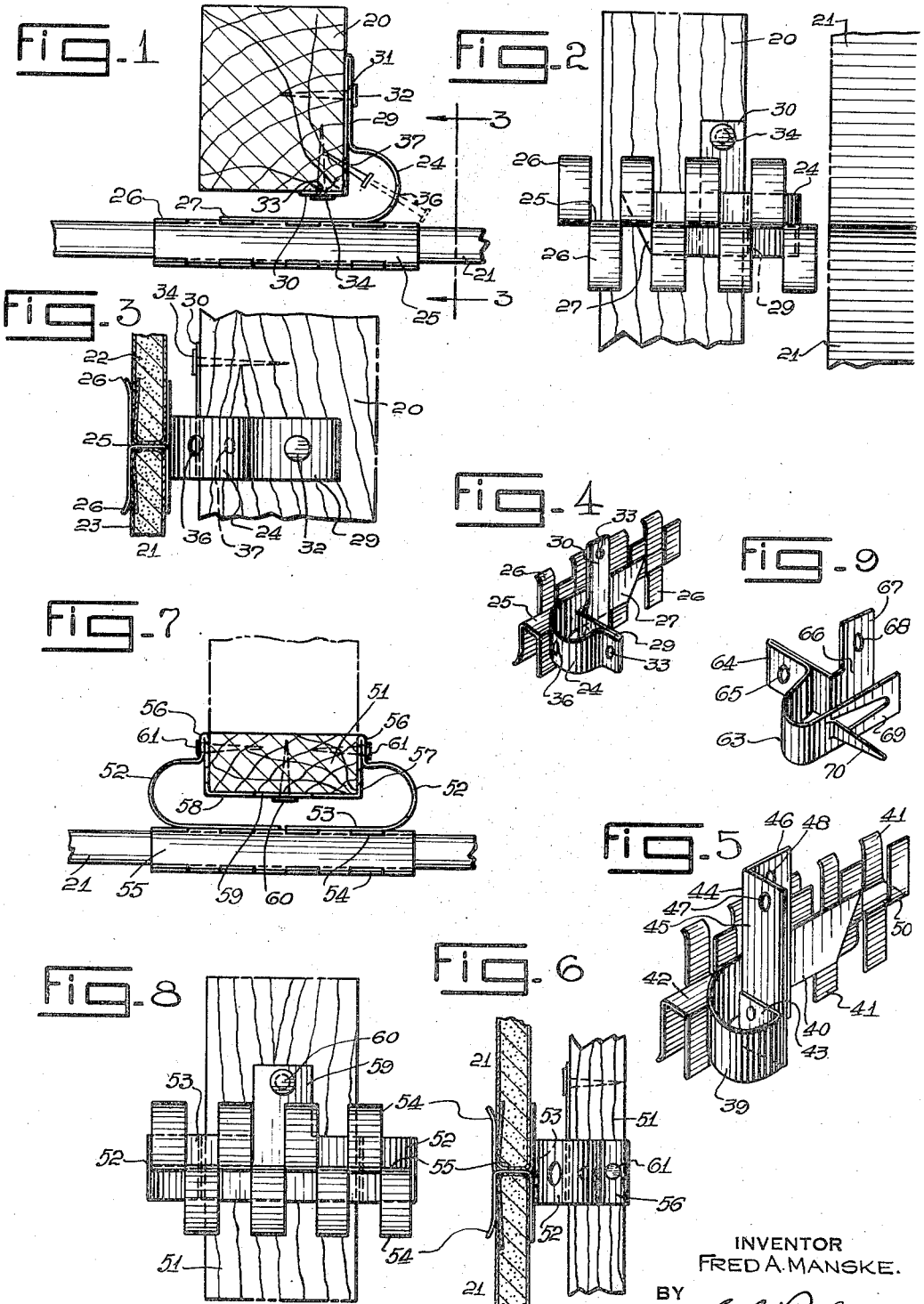

2,041,773

UNITED STATES PATENT OFFICE 2,041,773

RESILIENT BUILDING WALL CLIP CONSTRUCTION

Fred A. Manske, Chicago, Ill., assignor to United States Gypsum Company, Chicago, Ill., a corporation of Illinois Application December 19, 1932, Serial No. 647,902

8 Claims. (Cl. 72—118)

This invention relates to building constructions, and has reference more particularly to a building wall or ceiling construction in which resilient clips are used for attaching the facing building panels to the supporting framework of the building.

It has been proposed to attach building panels such as plaster board, fiber board, or plaster slabs, to the framework of a building to form walls or ceilings, by resilient clips which are nailed to the wooden studs or other building framework suitable for the reception of nails. These clips were arranged to have nails driven into the side of the stud during the erection of the building. In some cases it was found somewhat inconvenient to drive the nails into the side of the stud owing to the presence of interfering conduits or other objects commonly placed between the walls. The present invention deals with an improvement making for greater convenience and speed of erection by providing means for driving the nails from the front face of the wall directly into the front edge of the stud or other framework.

An object of this invention, therefore, is to provide resilient attaching clips for resilient building construction, in which provision is made for driving nails into the framework from the front of the wall, the nails extending transversally to the plane of the wall; also to improve building constructions in other respects hereinafter specified and claimed.

Reference is to be had to the accompanying drawings, forming a part of this specification, in which Fig. 1 is a transverse sectional view through a stud with my improved resilient clip in position, Fig. 2 is a fragmentary elevation of the construction shown in Fig. 1, Fig. 3 is a sectional elevation through the construction taken on line 3—3 of Fig. 1, Fig. 4 is a perspective view of a modified form of the resilient attaching clip, Fig. 5 is a perspective view showing the preferred form of construction of the clips, Fig. 6 is a sectional elevation of a further modified form of attaching clip, Fig. 7 is a transverse sectional view through a wall construction employing the form of attaching clip shown in Fig. 6, Fig. 8 is an elevation of a building construction employing the clip shown in Figs. 6 and 7, Fig. 9 is a perspective view of a further modified form of attaching clip suitable for use with expanded metal and a layer of plaster, Fig. 10 is a perspective view of a further modified form of attaching clip suitable for use with expanded metal lath and a layer of plaster, Fig. 11 is an elevation, with parts broken away to disclose the construction, of a building structure employing the clip shown in Fig. 10, Fig. 12 is a perspective view of a further modified form of clip similar to the clip shown in Figs. 10 and 11, but having the clip adapted to receive preformed wall panels at the corner of a room, Fig. 13 is a sectional elevation through a building construction at the corner of a room employing the clip shown in Fig. 12, Fig. 14 is a transverse sectional view through a building construction showing a modified form of clip, arranged to be used for receiving wall panels at a point somewhat above the floor of the room, Fig. 15 is a sectional elevation through the wall construction shown in Fig. 14, Fig. 16 is an elevation of a modified form of clip for receiving wall panels and arranged to be positioned adjacent the floor of the room, and Fig. 17 is a sectional elevation through the building construction shown in Fig. 16.

The improved wall construction may consist of a wooden stud 20 which is supported at its top and bottom in a vertical position by the framework of a building. Wallboard 21, which may consist of a standard plasterboard having a gypsum core material 22 with paper cover sheets 23, is resiliently supported in spaced relation to the studs 20 by means of flat spring loops 24. A clip plate 25 is provided along each of its edges with outstanding fingers or flanges 26 arranged to form two oppositely disposed channels for receiving the adjoining edges of the boards 21. The plate 25 is secured to an outstanding integral flange 27 formed on the loop 24, said flange being preferably spot welded directly to the outstanding fingers 26 on one side of the plate 25. The end of the loop 24 opposite the flange 27 is formed into a return bent, double thickness, flange 29, which terminates in a transversely extending and upstanding flange 30 so as to form an L shaped section arranged to embrace one corner of the stud 20. The flange 29 is provided with a nail hole 31 so that a nail 32 can be driven through said hole into the stud 20. The flange 30 is provided with a nail hole 33 for receiving the nail 34 to be driven into the stud 20, the axis of the nail 34 being at right angles to the plane of the board 21 and also at right angles to the axis of the nail 32. The axis of the nail 32 is substantially parallel to that of the board 21.

It will be noticed that in view of the fact that the two nails 32 and 34 are at right angles one to the other, when one nail head is in tension the other nail will be in shear so that the board is yieldingly but firmly attached to the stud 20, regardless of the type of stress placed on the resilient clip during or after erection. Furthermore, if it is found inconvenient to drive the nail 32, due to obstructions, such as doubling up of the studding, or piping which runs between the studs, it will be possible to rely entirely upon the nail 34 without driving the nail 32, due to the reinforcing action of flanges 29 and 30 which embrace the corner of the stud. However, if it is difficult to drive the nail 32, a hole 36 is formed in the spring loop 24, and a diagonal hole 37 in the single thickness flange 29, so that a nail not shown can be driven diagonally into the stud to reinforce the nail 34. In view of the fact that the nail 34 is positioned above the upper end of the fingers 26, the nail 34 may be conveniently driven into the stud 20 by means of face nailing, which insures maximum rapidity in erection with resulting low cost.

In Fig. 5, I illustrate my preferred form of attaching clip for use with wallboard. In this form of clip, the resilient spring loop 39 has an outstanding flange 40 which is spot welded to fingers 41 formed on the clip plate 42. The fingers 41 form opposite channels for the reception of the edges of the board 21 as in the devices described in Figs. 1–4. An inwardly extending flange 43 is formed on the end of the loop 39 opposite the flange 40. An angle strip 44 has one leg 45 spot welded or riveted to the flange 43, the other leg 46 co-operating with the leg 45 to embrace one corner of the wooden stud 20. A nail hole 47 is formed in the upper end of the leg 45 and a nail hole 48 in the upper end of the leg 46. Both nail holes 47 and 48 are located well above the upper end of the fingers 41 so as to provide plenty of clearance for convenient nailing both perpendicular to the face of the board and parallel with the face of the board. It should be understood that this type of clip is suitable for use not only for vertical walls, but also for ceilings. The angle strip 44 is positioned somewhat away from the center of the clip so that the free end 50 of the clip plate 42 may be broken off if desired in places where clearance during erection is necessary.

In the form of clip shown in Figs. 6–8, a nailing strip 51 is used and the clip is so designed as to be readily attached to said strip by side and face nailing. The clip is composed of a pair of spring loops 52 which have inwardly extending flanges 53. The flanges 53 are secured to outstanding fingers 54 formed on a clip plate 55, as by spot welding. The ends of the loops 52 opposite the flanges 53 are formed into flanges 56, which are bent double to form inwardly extending flanges 57 formed one on each end of a saddle member 58. The combined saddle member 58 and loops 52 form a substantially U-shaped structure. An outwardly extending flange 59 is formed on the saddle member 58 and is provided with a nail hole to receive a nail 60 driven into the nailing strip 51. Nail holes are formed in the flanges 56 for the reception of nails 61 which are driven transversely into the strip 51 with their axes substantially parallel to the board 21.

The form of clip illustrated in Fig. 9 is especially designed for resiliently supporting a sheet of expanded metal 77 forming the base for a plaster coat wall finish. This strip consists of a spring loop 63 having a return bent flange 64 at one end in which a nail hole 65 is provided. The flange 64 terminates in a right angle flange 66 which also extends upwardly to form a lug 67, said lug being provided with a nail hole 68 well above the top of the spring loop 63 so as to provide convenient access for nailing. The opposite end of the spring loop 63 is formed into a flange 69, and a prong 70 is struck out from the metal of the flange 69 so as to engage with the sheet of expanded metal 77, and be bent transversely in front of the metal sheet to secure the latter firmly to the spring loop 63. After the sheet of expanded metal is attached to the spring clip, a coating of plaster 78 is applied to finish the room.

Another type of attaching clip for use with expanded metal is shown in Figs. 10 and 11. This clip is composed of a nearly flat spring leaf 72, formed at one end into a transversely extending flange 73 provided with a nail hole 74 for face nailing to a stud. The other end of the spring 72 is return bent to form a clip body 75. A prong or tongue 76 is struck out from the metal of the flange 75 for engagement with metal lath 77 on which a layer of plaster 78 is applied. A spring section 79 is formed on the flange 73 opposite the spring leaf 72 and the section 79 terminates in an arcuate tip 80 forming a bumper or stop to give added spring resistance for supporting the wall when subjected to blows or shocks.

In the form of clip shown in Figs. 12 and 13, means is provided for securing wallboard to the building frame at the corner of a room. This type of spring clip resembles the clip shown in Figs. 10 and 11, in that a fairly flat spring leaf 82 is returned bent at one end to form a flange 83. A pair of clip plates 84 and 85 are secured to the flange 83, as by spot welding, said clip plates having outstanding fingers 86 and 87 respectively, which form channels positioned at 90 degrees one to the other to receive the wallboard 21 at the corner of a room. The spring leaf 82 has a downwardly extending flange 90 provided with a nail hole 91 for face nailing the flange 90 to a stud. A bumper leaf 92 having an arcuate bumper tip 93, is formed on the flange 90.

The clip illustrated in Figs. 16 and 17 is adapted to receive the bottom edge of the board 21 adjacent a floor 93a. This form of attaching clip is similar to that shown in Fig. 12, except that the clip plate 94 has outstanding fingers 95 forming an upwardly extending channel only for receiving the bottom edge of the board 21. The form of clip shown in Figs. 14 and 15 is for use in a wall midway between the floor and ceiling. This form of clip resembles that shown in Figs. 16 and 17, except that the clip plate 96 has fingers 97 extending outwardly from the plate to form two opposite channels for receiving the adjoining edges of the board 21.

My improved clips provide a one purpose clip for side nailing for ceilings, for face nailing for walls, for face nailing to outside wall furring strips, for face nailing for starting and finishing, for face nailing for starting and finishing a wall, and for side or face nailing for corners. The clips also provide for attachment to furring strips or other framework which is comparatively of shallow depth.

I would state in conclusion that while the illustrated examples constitute practical embodiments of my invention, I do not wish to limit myself precisely to these details, since manifestly, the same may be considerably varied without departing from the spirit of the invention as defined in the appended claims.

Having thus described my invention, I claim as new and desire to secure by Letters Patent:

1. In a device of the class described, the combination with a building frame, of a clip having a resilient loop and positioned adjacent said building frame, means on one end of said loop for attachment to a wall facing panel, an attaching member formed on the opposite end of said loop, said member being angular in cross section to form two frame engaging legs, each of said legs having an opening, and nails driven into said frame through said openings in planes substantially parallel to and/or also substantially vertically to the plane of said panel.

2. In a device of the class described, the combination with a building frame of wood, of a clip having a resilient loop and positioned adjacent said building frame, outstanding spaced fingers on one end of said loop forming channels for the adjacent edges of wall panels, an angle member secured to the other end only of said loop, said member having two legs embracing a corner of said frame, said legs having nail receiving openings, and nails driven through said openings into said frame substantially vertically and/or also substantially parallel to the plane of said panel.

3. In a device of the class described, the combination with a building frame, of a clip having a resilient loop and positioned adjacent said building frame, a tongue formed on one end of said loop, a sheet of expanded metal lath supported by said tongue, a cementitious coating on said metal lath, an angular attaching member formed on the opposite end only of said loop and embracing a corner of said frame, said attaching member having nailing openings facing in two directions at right angles, one to the other, and nails driven through one or more of said openings into said frame.

4. In a device of the class described, a stud attaching member having a pair of openings, the axes of said openings extending at substantially right angles one to the other, and means associated with said member for resiliently supporting a wall facing panel, said resilient means being offset from said openings to permit nailing through said openings.

5. In a building clip, a U-shaped flat spring clip having outstanding loop ends, a U-shaped saddle member supported between said loop ends and adapted to receive a nailing strip, nail receiving holes in said loop ends and saddle member, the axis of one of said holes being substantially at right angles to another of said holes, and means associated with said spring clip for supporting a wall facing panel.

6. In a building clip, a flat spring loop having an attaching member at one end, nail holes extending diagonally through said spring loop and said attaching member, and means on the other end of said spring loop for supporting a wall panel.

7. In a device of the class described, a flat, arcuate spring loop, a wall panel attaching member secured to one end of said loop, a flange formed on the other end of said loop extending toward said member, and an angle strip secured to said flange and extending outwardly from said loop substantially parallel to the axis thereof, said angle strip having a pair of nail holes at right angles one to the other for face and side nailing to a building frame, said nail holes being positioned beyond said attaching member.

8. In a device of the class described, a flat, arcuate spring loop, a wall panel attaching member secured to a flange formed on one end of said loop, said attaching member forming opposed channels for receiving the adjoining edges of wall panels, and an angle strip extending outwardly from said loop and having nail holes whose axes extend at right angles one to the other.

FRED A. MANSKE.